United States Patent
Matsumura et al.

(10) Patent No.: US 12,513,764 B2
(45) Date of Patent: Dec. 30, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 437 days.

(21) Appl. No.: 18/005,258

(22) PCT Filed: Jul. 30, 2020

(86) PCT No.: PCT/JP2020/029343
§ 371 (c)(1),
(2) Date: Jan. 12, 2023

(87) PCT Pub. No.: WO2022/024327
PCT Pub. Date: Feb. 3, 2022

(65) Prior Publication Data
US 2023/0254928 A1    Aug. 10, 2023

(51) Int. Cl.
*H04W 76/19* (2018.01)
*H04W 74/0833* (2024.01)
(Continued)

(52) U.S. Cl.
CPC ....... *H04W 76/19* (2018.02); *H04W 74/0833* (2013.01); *H04W 74/0836* (2024.01); *H04W 74/0838* (2024.01)

(58) Field of Classification Search
CPC .......................... H04W 76/19; H04W 74/0833
See application file for complete search history.

(56) References Cited

U.S. PATENT DOCUMENTS

2021/0037573 A1* 2/2021 Ly ................... H04W 74/0833
2021/0259022 A1* 8/2021 Pezeshki ............... H04L 5/0048
(Continued)

FOREIGN PATENT DOCUMENTS

WO       2019119399 A1       6/2019

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
(Continued)

*Primary Examiner* — Redentor Pasia
(74) *Attorney, Agent, or Firm* — Osha Bergman Watanabe & Burton LLP

(57) ABSTRACT

A terminal according to an aspect of the present disclosure includes: a transmitting section that transmits a random access preamble in a given cell in a case where a beam failure is detected; and a control section that assumes the same antenna port quasi-collocation parameters as ones associated with an index of a reference signal corresponding to the random access preamble for monitoring of a downlink control channel in a given control resource set, after a given period from the last symbol of first downlink control channel reception where a downlink control information format having a cyclic redundancy check (CRC) scrambled by a cell radio network temporary identifier (C-RNTI) and containing an uplink grant for new transmission is detected and until specific information regarding a transmission configuration indication (TCI) state of the downlink control channel is received, in a case where a beam failure recovery medium access control control element (MAC CE) is transmitted in a message 3 or a message A of a contention based random
(Continued)

access procedure corresponding to the random access preamble. According to an aspect of the present disclosure, it is possible to appropriately update a beam in relation to BFR.

4 Claims, 9 Drawing Sheets

(51) Int. Cl.
*H04W 74/0836* (2024.01)
*H04W 74/0838* (2024.01)

(56) References Cited

U.S. PATENT DOCUMENTS

| | | | | |
|---|---|---|---|---|
| 2021/0337453 A1* | 10/2021 | Gao | .................... | H04W 52/365 |
| 2022/0022065 A1* | 1/2022 | Wang | .................... | H04W 24/08 |
| 2022/0124860 A1* | 4/2022 | Guo | ...................... | H04W 72/02 |
| 2022/0200687 A1* | 6/2022 | Guo | ....................... | H04L 5/0053 |
| 2023/0189245 A1* | 6/2023 | Alfarhan | ............... | H04L 1/1854 |
| | | | | 370/329 |
| 2023/0198602 A1* | 6/2023 | Zeineddine | ........... | H04W 76/19 |
| | | | | 370/329 |
| 2023/0209634 A1* | 6/2023 | Koskela | .............. | H04W 36/305 |
| | | | | 370/217 |
| 2024/0292233 A1* | 8/2024 | Kang | ........................ | H04L 5/00 |

OTHER PUBLICATIONS

3GPP TS 38.213 V16.1.0 "3rd Generation Partnership Project; Technical Specification Group Radio Access Network; NR; Physical layer procedures for control (Release 16)" Mar. 2020 (156 pages).
International Search Report issued in International Application No. PCT/JP2020/029343, mailed Mar. 9, 2021 (5 pages).
Written Opinion issued in International Application No. PCT/JP2020/029343; Dated Mar. 9, 2021 (3 pages).
Office Action issued in counterpart Japanese Application No. 2022-539925, mailed Mar. 12, 2024 (7 pages).
Nokia, Nokia Shanghai Bell: "Maintenance of Rel-16 Beam Management", 3GPP TSG RAN WG1 #101; R1-2004266, e-meeting, May 25-Jun. 5, 2020 (7 pages).

* cited by examiner

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a universal mobile telecommunications system (UMTS) network, specifications of long term evolution (LTE) have been drafted for the purpose of further increasing data rates, providing low latency, and the like (Non Patent Literature 1). In addition, the specifications of LTE-Advanced (3GPP Rel. 10 to 14) have been drafted for the purpose of further increasing capacity and advancement of LTE (third generation partnership project (3GPP) release (Rel.) 8 and 9).

Successor systems to LTE (for example, also referred to as 5th generation mobile communication system (5G), 5G+ (plus), 6th generation mobile communication system (6G), New Radio (NR), or 3GPP Rel. 15 and subsequent releases) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In the NR, it has been studied to perform a procedure for a user terminal (user terminal or user equipment (UE)) to detect a beam failure (BF) and switch to another beam (which may also be referred to as a beam failure recovery (BFR) procedure, BFR, and the like).

However, in current Rel. 16 NR specification, there may be a case where a failed beam is continuously used after completion of the BFR. In this case, appropriate communication cannot be performed, so that a reduction in throughput or a degradation in communication quality may be caused.

Therefore, an object of the present disclosure is to provide a terminal, a radio communication method, and a base station capable of appropriately updating a beam in relation to BFR.

Solution to Problem

A terminal according to an aspect of the present disclosure includes: a transmitting section that transmits a random access preamble in a given cell in a case where a beam failure is detected; and a control section that assumes the same antenna port quasi-collocation parameters as ones associated with an index of a reference signal corresponding to the random access preamble for monitoring of a downlink control channel in a given control resource set, after a given period from the last symbol of first downlink control channel reception where a downlink control information format having a cyclic redundancy check (CRC) scrambled by a cell radio network temporary identifier (C-RNTI) and containing an uplink grant for new transmission is detected and until specific information regarding a transmission configuration indication (TCI) state of the downlink control channel is received, in a case where a beam failure recovery medium access control control element (MAC CE) is transmitted in a message 3 or a message A of a contention based random access procedure corresponding to the random access preamble.

Advantageous Effects of Invention

According to an aspect of the present disclosure, it is possible to appropriately update a beam in relation to BFR.

DESCRIPTION OF EMBODIMENTS (Beam Failure Recovery)

In NR, communication using beam forming has been studied. For example, a UE and a base station (for example, gNodeB (gNB)) may use a beam used for signal transmission (which is also referred to as a transmission beam, a Tx beam, or the like) or a beam used for signal reception (which is also referred to as a reception beam, an Rx beam, or the like).

In a case where beam forming is used, degradation of radio link quality is assumed because it becomes susceptible to interference by an obstacle. A radio link failure (RLF) may frequently occur due to degradation of the radio link quality. When the RLF occurs, cell re-connection is required, and thus frequent occurrence of the RLF leads to degradation of system throughput.

In the NR, to suppress the occurrence of the RLF, it has been studied to perform a procedure of switching to another beam (which may also be referred to as beam recovery (BR), beam failure recovery (BFR), Layer 1/Layer 2 (L1/L2) beam recovery, or the like) in a case where quality of a specific beam degrades. The BFR procedure may be simply referred to as BFR.

Note that a beam failure (BF) in the present disclosure may be referred to as a link failure, a radio link failure (RLF).

Figure 1:
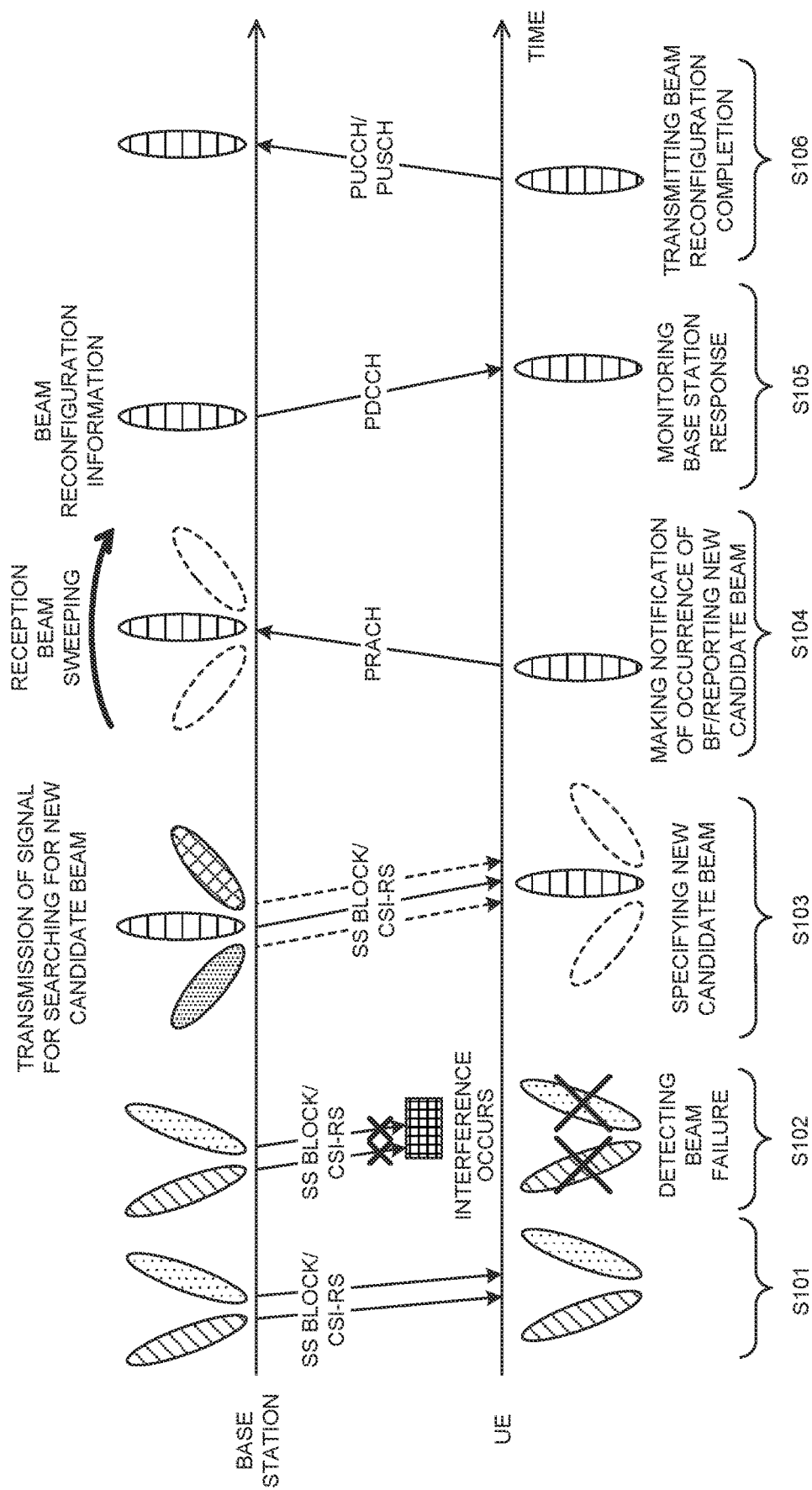
FIG. 1 is a diagram illustrating an example of a beam recovery procedure in Rel. 15 NR.

FIG. 1 is a diagram illustrating an example of a beam recovery procedure in Rel. 15 NR. The number of beams, or the like, is an example, and is not limited thereto. In an initial state (step S101) in FIG. 1, the UE performs measurement based on a reference signal (RS) resource transmitted using two beams.

The RS may be at least one of a synchronization signal block (SSB) or a channel state information RS (CSI-RS). Note that an SSB may also be referred to as an SS/physical broadcast channel (PBCH) block, or the like.

The RS may be at least one of a primary synchronization signal (primary SS (PSS)), a secondary synchronization signal (secondary SS (SSS)), a mobility reference signal (mobility RS (MRS)), a signal included in an SSB, the SSB, a CSI-RS, a demodulation reference signal (DMRS), a beam-specific signal, or the like, or a signal configured by extending or changing these. The RS measured in step S101 may be referred to as an RS for beam failure detection (beam failure detection RS (BFD-RS)), or the like.

In step S102, interference in radio waves from the base station occurs, whereby the UE cannot detect the BFD-RS (or reception quality of the RS degrades). Such interference may occur due to, for example, an effect of an obstacle between the UE and the base station, fading, interference, or the like.

After a given condition is satisfied, the UE detects a beam failure. For example, the UE may detect occurrence of a beam failure in a case where a block error rate (BLER) is less than a threshold value for all of the configured BFD-RS (BFD-RS resource configurations). When the occurrence of the beam failure is detected, a lower layer (physical (PHY) layer) of the UE may perform notification (indication) of a beam failure instance to a higher layer (MAC layer).

Note that a criterion for determination is not limited to the BLER, and may be reference signal received power in a physical layer (Layer 1 reference signal received power (L1-RSRP)). Further, instead of RS measurement or in addition to RS measurement, beam failure detection may be performed on the basis of a downlink control channel (physical downlink control channel (PDCCH)) or the like. The BFD-RS may be expected to be in a quasi-co-location (QCL) with a DMRS of the PDCCH monitored by the UE.

Here, the QCL is an indicator indicating a statistical property of a channel. For example, in a case where one signal/channel and another signal/channel have a QCL relation, this may mean that it is possible to assume that these multiple different signals/channels have at least one identical property out of a Doppler shift, a Doppler spread, an average delay, a delay spread, or a spatial parameter (for example, spatial Rx filter/parameter, spatial Tx (transmission) filter/parameter) (a QCL relation is established regarding at least one of these).

Note that, the spatial Rx parameter may correspond to a reception beam of the UE (for example, a reception analog beam), and the beam may be specified on the basis of spatial QCL. The QCL (or at least one element of the QCL) in the present disclosure may be replaced with the spatial QCL (sQCL).

Information regarding the BFD-RS (for example, an RS index, resource, number, number of ports, precoding, or the like), information regarding beam failure detection (BFD) (for example, the above-described threshold value), or the like may be configured in (notified to) the UE by using higher layer signaling, or the like. The information regarding the BFD-RS may also be referred to as information regarding a resource for BFR, or the like.

In the present disclosure, the higher layer signaling may be any of, for example, radio resource control (RRC) signaling, medium access control (MAC) signaling, broadcast information, and the like, or a combination thereof.

For example, a MAC control element (CE), a MAC protocol data unit (PDU), or the like may be used for the MAC signaling. The broadcast information may be, for example, a master information block (MIB), a system information block (SIB), remaining minimum system information (RMSI), other system information (OSI), and the like.

The MAC layer of the UE may start a given timer (which may also be referred to as a beam failure detection timer) in a case where a beam failure instance notification is received from the PHY layer of the UE. The MAC layer of the UE may trigger BFR (for example, start any one of random access procedures to be described later) after receiving the beam failure instance notification a given number of times (for example, beamFailureInstanceMaxCount configured by RRC) or more before the timer expires.

The base station may determine that the UE has detected a beam failure in a case where there is no notification from the UE (for example, time for which there is no notification exceeds a given time) or in a case where a given signal (beam recovery request in step S104) is received from the UE.

In step S103, for beam recovery, UE starts a search for a new candidate beam to be newly used for communication. The UE may measure a given RS to select a new candidate beam corresponding to the RS. The RS measured in step S103 may be referred to as a new candidate beam identification RS (NCBI-RS), a CBI-RS, a candidate beam RS (CB-RS), or the like. The NCBI-RS may be the same as or different from the BFD-RS. Note that the new candidate beam may be referred to as a new candidate beam, a candidate beam, or a new beam.

The UE may determine a beam corresponding to an RS that satisfies a given condition as a new candidate beam. The UE may determine a new candidate beam on the basis of, for example, an RS whose L1-RSRP exceeds a threshold value among configured NCBI-RSs. Note that a criterion for determination is not limited to L1-RSRP. The determination may be made using at least any one of L1-RSRP, L1-RSRQ, or L1-SINR (signal to noise interference power ratio). L1-RSRP regarding an SSB may also be referred to as SS-RSRP. L1-RSRP regarding a CSI-RS may also be referred to as CSI-RSRP. Similarly, L1-RSRQ regarding an SSB may also be referred to as SS-RSRQ. L1-RSRQ regarding a CSI-RS may also be referred to as CSI-RSRQ. Further, similarly, L1-SINR regarding an SSB may be referred to as SS-SINR. L1-SINR regarding a CSI-RS may be referred to as CSI-SINR.

Information regarding an NCBI-RS (for example, an RS resource, number, number of ports, precoding, or the like), information regarding new candidate beam identification (NCBI) (for example, the above-described threshold value), or the like may be configured in (notified) the UE using higher layer signaling, or the like. The information regarding the NCBI-RS may be acquired on the basis of the information regarding the BFD-RS. The information regarding the NCBI-RS may also be referred to as information regarding an NCBI resource, or the like.

Note that the BFD-RS, NCBI-RS, or the like may be replaced with a radio link monitoring reference signal (RLM-RS).

In step S104, the UE that has specified the new candidate beam transmits a beam failure recovery request (BFRQ). The beam failure recovery request may also be referred to as a beam recovery request signal, a beam failure recovery request signal, or the like.

The BFRQ may be transmitted using, for example, a physical random access channel (PRACH). The BFRQ may include information on the new candidate beam specified in step S103. A resource for the BFRQ may be associated with the new candidate beam. Notification of the information on the beam may be performed using, for example, a beam index (BI), a port index of a given reference signal, a resource index (for example, CSI-RS resource indicator (CRI), SSB resource indicator (SSBRI)), or the like.

In Rel. 15 NR, contention based BFR (CB-BFR) which is BFR based on a contention based random access (CBRA) procedure and contention-free BFR (CF-BFR) which is BFR based on a contention-free random access (CFRA) procedure are supported. In the CB-BFR or the CF-BFR, the UE may transmit a preamble (which is also referred to as an RA preamble, a physical random access channel (PRACH), an RACH preamble, or the like) as the BFRQ by using a PRACH resource.

Note that the CF-BFR may also be referred to as CFRA BFR. The CB-BFR may also be referred to as CBRA BFR. The CFRA procedure and the CFRA may be replaced with each other. The CBRA procedure and the CBRA may be replaced with each other.

In step S105, the base station that has detected the BFRQ transmits a response signal (which may also be referred to as a "BFR response", "gNB response" or the like) for the BFRQ from the UE. The response signal may include reconfiguration information (for example, DL-RS resource configuration information) for one or more beams.

The response signal may be transmitted, for example, in a UE common search space of a PDCCH. The notification of the response signal may be performed by using a PDCCH (DCI) having a cyclic redundancy check (CRC) scrambled by an identifier (for example, a cell radio network temporary identifier (C-RNTI)) of the UE. The UE may determine at least one of a transmission beam or a reception beam to be used, on the basis of beam reconfiguration information.

The UE may monitor the response signal on the basis of at least either a control resource set (CORESET) for BFR or a search space set for BFR. For example, the UE may detect the DCI with the CRC scrambled with the C-RNTI in the BFR search space in a CORESET individually configured.

For the CB-BFR, contention resolution may be determined to be successful in a case where the UE receives a PDCCH corresponding to the C-RNTI regarding the UE itself.

Regarding the processing in step S105, a period may be set for the UE to monitor a response from the base station (for example, gNB) for the BFRQ. The period may also be referred to as, for example, a gNB response window, a gNB window, a beam recovery request response window, a BFRQ response window, or the like. The UE may retransmit the BFRQ in a case where no gNB response is detected within the window period.

In step S106, the UE may transmit a message indicating that beam reconfiguration is completed to the base station. The message may be transmitted by the PUCCH or PUSCH, for example.

In step S106, the UE may receive RRC signaling indicating a configuration of a transmission configuration indication state (TCI state) used for the PDCCH, or may receive a MAC CE indicating activation of the configuration.

Beam recovery success (BR success) may represent a case where step S106 is reached, for example. On the other hand, beam recovery failure (BR failure) may correspond to, for example, a case where the number of times of BFRQ transmission has reached a given number, or a beam-failure-recovery-timer has expired.

Note that numbers of these steps are merely numbers for description, and a plurality of these steps may be combined, or the order of these steps may be changed. Further, whether or not to perform BFR may be configured in the UE by using higher layer signaling.

(CBRA)

In the NR, as the contention based random access (CBRA) also used in the CB-BFR, there are a 4-step CBRA procedure defined in Rel. 15 and a 2-step CBRA procedure defined in Rel. 16. The former may be referred to as 4-step RACH, and the latter may be referred to as 2-step RACH.

Figure 2:
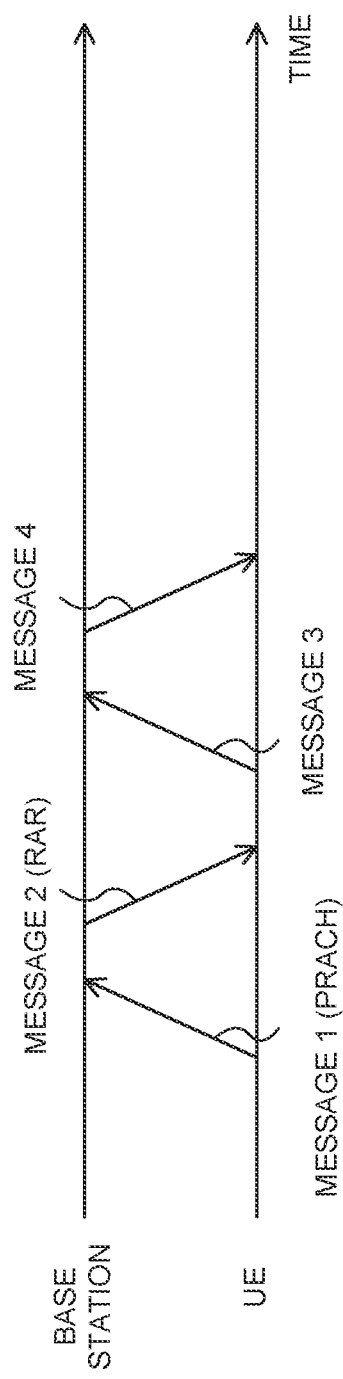
FIG. 2 is a diagram illustrating a flow of 4-step random access channel (RACH).

FIG. 2 is a diagram illustrating an example of the 4-step PACH. In the 4-step RACH, the UE first transmits a message 1 (random access preamble). The base station returns a message 2 including a response (random access response (RAR)) corresponding to the message 1 to the UE.

Note that a DCI format for scheduling the RAR has a CRC scrambled by a random access RNTI (RA-RNTI).

The UE transmits a UE identifier (ID) for contention resolution by using a message 3 on the basis of a UL grant indicated by the RAR. The UE ID may be, for example, Short (or SAE)-Temporary Mobile Subscriber Identity (S-TMSI).

In a case where the UE is in an idle state (RRC_IDLE state) (in a case where the UE is an idle UE), the message 3 includes a common control channel service data unit (CCCH SDU). A CCCH is a logical channel used in a case where there is no RRC connection. The CCCH SDU may transmit an RRC message (for example, an RRC connection request) including the UE ID.

In a case where the UE is a connected UE (UE in RRC_CONNECTED state), the message 3 may include (a MAC CE for making notification of) the C-RNTI.

If the UE ID transmitted using the message 3 does not collide with another UE, the base station returns a message 4 including a contention resolution ID to the UE.

Figure 3:
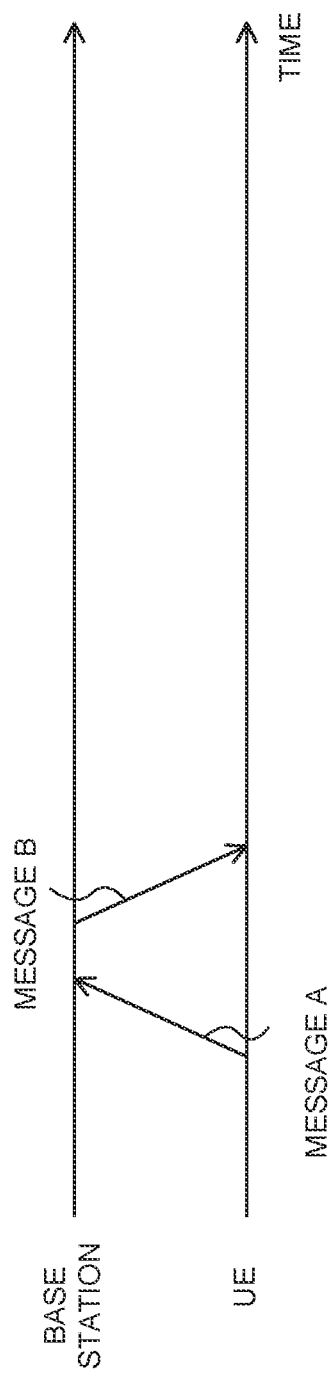
FIG. 3 is a diagram illustrating a flow of 2-step RACH.

FIG. 3 is a diagram illustrating an example of the 2-step RACH. In the 2-step RACH, the UE first transmits a message A. The message A includes a preamble that is subjected to time division multiplexing (TDM) and a PUSCH, and corresponds to messages 1+3 of the 4-step RACH. The UE ID may be transmitted on the PUSCH.

After receiving the message A, the base station returns a message B to the terminal. The message B includes a PDSCH (and a PDCCH for scheduling the PDSCH) and corresponds to the messages 2+4 of the 4-step RACH. The notification of the contents of the RAR and the contention resolution ID may be made by using the message B.

Note that a DCI format for scheduling the message 4 or the message B for the UE may have a CRC scrambled by a temporary C-RNTI (TC-RNTI) in a case where the UE is an idle UE, and may have a CRC scrambled by a C-RNTI in a case where the UE is a connected UE.

In a case where the idle UE that has received the message 4 or the message B succeeds in decoding the received message and the contention resolution ID in the message matches that of the CCCH SDU transmitted in the message 3 or the message A, the idle UE may consider that the CBRA is successful (the contention has been resolved). Furthermore, the UE may transmit HARQ-ACK for the received message. The base station that has received the HARQ-ACK may set the value of the TC-RNTI as the C-RNTI of the UE.

In a case where the DCI (PDCCH) that has scheduled the received message indicates the C-RNTI and contains a UL grant for new transmission, the connected UE that has received the message 4 or the message B may consider that the CBRA is successful (contention has been resolved).

Note that, in the flow of BFR in FIG. 1, BFRQ transmission in step S104 corresponds to transmission of the message 1 or the message A in a case of the CBRA BFR. Further, BFR response reception in step S105 corresponds to reception of the message 4 or the message B (and reception of the DCI that schedules them) in a case of the CBRA BFR.

(QCL Assumption of PDCCH after BFR and PUCCH Spatial Relation)

In the Rel. 16 NR specification (TS 38.213 V16.0.0 § 6 Link recovery procedures) which has been studied so far, update of QCL (beam) for a PDCCH after BFR is described as follows.

For PDCCH monitoring in a search space set provided by recoverySearchSpaceId and for corresponding PDSCH reception, the UE assumes the same antenna port quasi-collocation parameters as the ones associated with index $q_{new}$ until the UE receives by higher layers an activation for a TCI state or any of the parameters tci-StatesPDCCH-ToAddList and/or tci-StatesPDCCH-ToReleaseList.

For the PCell or the PSCell, after 28 symbols from a last symbol of a first PDCCH reception in a search space set provided by recoverySearchSpaceId where a UE detects a DCI format with CRC scrambled by C-RNTI or MCS-C-RNTI, the UE assumes same antenna port quasi-collocation parameters as the ones associated with index $q_{new}$ for PDCCH monitoring in a CORESET with index 0.

In addition, in the Rel. 16 NR specification described above, update of a spatial relation (beam) for a PUCCH after BFR is described as follows.

For the PCell or the PSCell, after 28 symbols from a last symbol of a first PDCCH reception in a search space set provided by recoverySearchSpace ID for which the UE detects a DCI format with CRC scrambled by C-RNTI or MCS-C-RNTI and until the UE receives an activation command for PUCCH-SpatialRelationInfo or is provided PUCCH-SpatialRelationInfo for PUCCH resource(s), the UE transmits a PUCCH on a same cell as the PRACH transmission using a transmission condition.

A same spatial filter as for the last PRACH transmission is used.

The transmission power is determined by using $q_u=0$, $q_d=q_{new}$, l=0 in a formula (Subclause 7.2.1 of TS 38.213) used to determine the PUCCH transmission power.

Note that $q_{new}$ may be an index of a new candidate beam (for example, an SSB/CSI-RS) selected by the UE in the BFR procedure and reported on a corresponding PRACH to a network (or an index of a new beam found in the BFR procedure).

In a normal case, $q_u$ may be a PUCCH P0 ID (p0-PUCCH-Id) indicating P0 for a PUCCH (P0-PUCCH) in a PUCCH P0 set (p0-Set). l may be referred to as an index of a power control adjustment state, an index of a PUCCH power control adjustment state, a closed loop index, or the like. $q_d$ may be an index (for example, set by PUCCH-PathlossReferenceRS) of a path loss reference RS.

With the definition as described above, for a PDCCH/PUCCH, it is possible to avoid performing transmission/reception processing based on an unclear beam after completion of the RA procedure for BFR until an explicit beam is set/activated, and it is thus possible to suppress degradation in communication quality.

However, the above definition assumes the CFRA BFR. For this reason, after completion of the CBRA BFR, the beam of the PDCCH/PUCCH is not updated, a failed beam is continuously used, as a result of which appropriate communication cannot be performed, and thus, reduction in throughput or a degradation in communication quality may be caused.

Therefore, the present inventors have conceived a method for properly updating a beam in relation to BFR.

Hereinafter, embodiments according to the present disclosure will be described in detail with reference to the drawings. The radio communication methods according to the embodiments may be applied alone or in combination.

In the present disclosure, "A/B" and "at least one of A or B" may be interchangeable.

In the present disclosure, the index, the ID, the indicator, the resource ID, and the like may be replaced with each other.

(Radio Communication Method)

First Embodiment

In a first embodiment, the UE updates assumption of a spatial relation for a PUCCH after completing the CBRA BFR.

In the first embodiment, the update of the spatial relation for a PUCCH after the BFR may be performed as follows:

For the PCell or the PSCell, if BFR MAC CE is transmitted in Msg3 or MsgA of contention based random access procedure, after X symbols from a last symbol of a first PDCCH reception (of Msg4 or MsgB) where the UE detects a DCI format with CRC scrambled by C-RNTI which contains a UL grant for a new transmission and until the UE receives an activation command for PUCCH-SpatialRelationInfo or is provided PUCCH-SpatialRelationInfo for PUCCH resource(s), the UE transmits a PUCCH on a same cell as the PRACH transmission using a transmission condition.

A same spatial filter as for the last PRACH transmission is used.

The transmission power is determined by using $q_u=0$, $q_d=q_{newCBRA}$ (or $q_{new}$), l=0, and the like in a formula (Subclause 7.2.1 of TS 38.213) used to determine the PUCCH transmission power.

Note that $q_{newCBRA}$ (or $q_{new}$) may be an index of a new beam (for example, an SSB/CSI-RS) selected by the UE in the CBRA BFR procedure and reported on a corresponding PRACH (or an index of a new candidate beam found in the BFR procedure). In other words, $q_{newCBRA}$ (or $q_{new}$) may correspond to an SS/PBCH block index selected for the last PRACH transmission), or may correspond to an SS/PBCH block index provided by the BFR MAC CE, or may correspond to an SS/PBCH block index provided in a higher layer (for example, MAC layer).

Further, X described above may be determined in advance by the specifications (for example, X=28), may be set by the higher layer signaling or the like, or may be determined on the basis of the UE capability (for example, the UE capability related to the BFR).

In a case where the BFR MAC CE is transmitted in the message 3 or the message A of the CBRA, the UE may update the assumption of the spatial relation for the PUCCH after completion of the CBRA. In this case, the base station can identify whether the message 3 or the message A is for CBRA BFR or for other CBRAs on the basis of whether or not the messages include the BFR MAC CE. Thereby, both the base station and the UE can control PUCCH transmission/reception after recognizing CBRA BFR completion.

Note that the BFR MAC CE in the present disclosure may be a MAC CE including information for identifying a cell (for example, PCell, PSCell, SCell, or the like) in which a beam failure has been detected. The MAC CE may include information (for example, SSB index or CSI-RS index) of a new candidate beam (candidate RS).

In addition, "until the UE receives an activation command for PUCCH-SpatialRelationInfo or is provided PUCCH-SpatialRelationInfo for PUCCH resource(s)" in the present disclosure may be replaced with "until the UE receives an activation command for PUCCH-SpatialRelationInfo and if PUCCH-SpatialRelationInfo is provided for PUCCH resource(s)".

Figure 4:
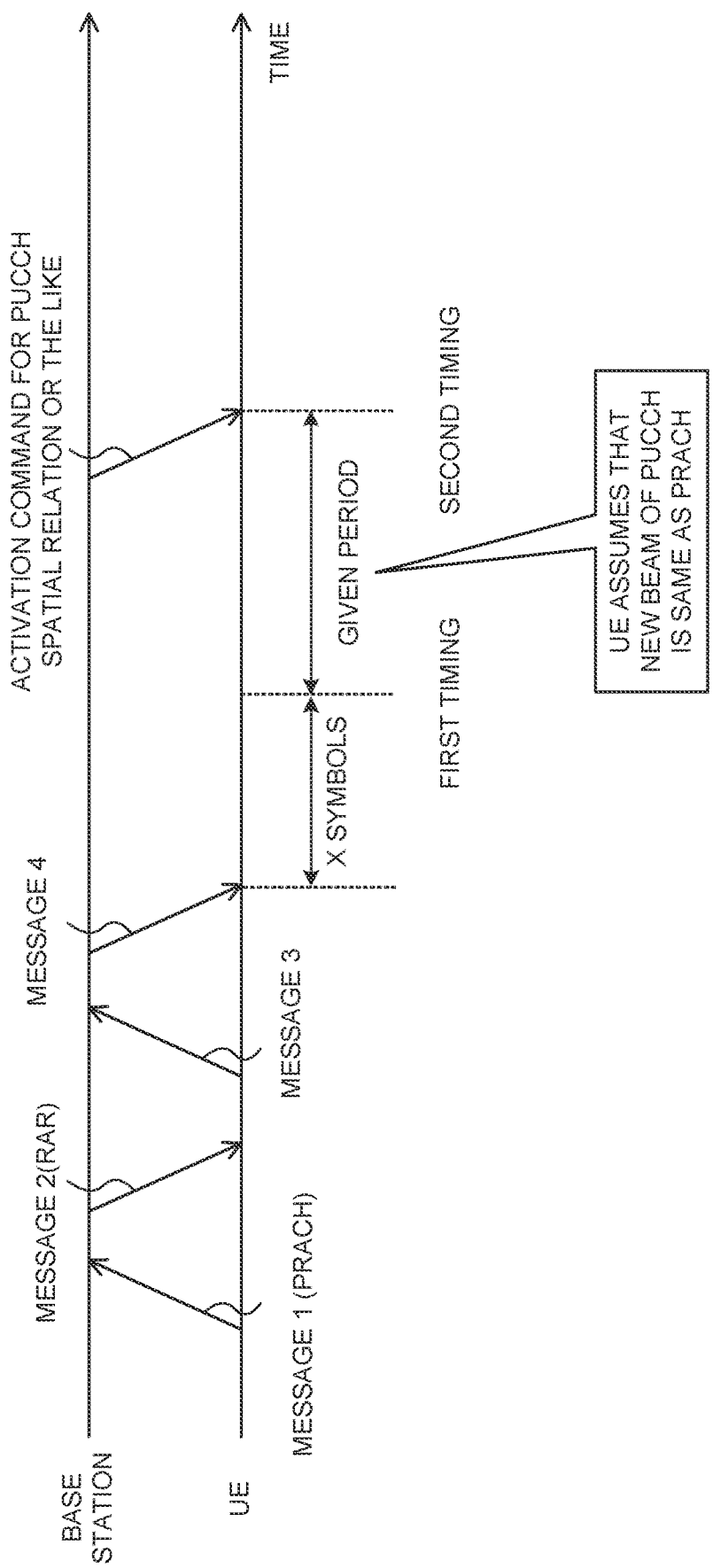
FIG. 4 is a diagram illustrating an example of update of a spatial relation for a physical uplink control channel (PUCCH) after contention based random access (CBRA) beam failure recovery (BFR) in a first embodiment.

FIG. 4 is a diagram illustrating an example of update of a spatial relation for a PUCCH after the CBRA BFR in the first embodiment. In this example, the UE assumes that a new beam of a PUCCH is the same as (a new beam of) a PRACH (the above-described transmission conditions are used for transmission of the PUCCH) from a first timing to a second timing after completion of the CBRA BFR.

The first timing in FIG. 4 may be X symbols after the last symbol of PDCCH reception of the first message 4 where the CRC is scrambled by the C-RNTI and the UE detects a DCI format containing a UL grant for new transmission.

The second timing in FIG. 4 may be a timing at which an activation command for PUCCH spatial relation information is received for a cell in which the CBRA BFR has been performed.

According to the first embodiment described above, the UE can appropriately use a beam recovered by the CBRA BFR for subsequent transmission of the PUCCH.

Second Embodiment

In a second embodiment, the UE updates QCL assumption of a PDCCH after completing the CBRA BFR.

In the second embodiment, the update of the QCL assumption for a PDCCH after the BFR may be performed on the basis of at least one of the following.

For the PCell or the PSCell, if BFR MAC CE is transmitted in Msg3 or MsgA of contention based random access procedure, after X symbols from a last symbol of a first PDCCH reception (of Msg4 or MsgB) where the UE detects a DCI format with CRC scrambled by C-RNTI which contains a UL grant for a new transmission, the UE assumes the same antenna port quasi-collocation parameters as the ones associated with index $q_{new}$ for PDCCH monitoring in a CORESET (and for corresponding PDSCH reception) until the UE receives by higher layers an activation for a TCI state or any of the parameters tci-StatesPDCCH-ToAddList and/or tci-StatesPDCCH-ToReleaseList.

For the PCell or the PSCell, if BFR MAC CE is transmitted in Msg3 or MsgA of contention based random access procedure, after X symbols from a last symbol of a first PDCCH reception (of Msg4 or MsgB) where the UE detects a DCI format with CRC scrambled by C-RNTI which contains a UL grant for a new transmission, the UE assumes the same antenna port quasi-collocation parameters as the ones associated with index $q_{new}$ for PDCCH monitoring in CORESET of controlResourceSetZero (or in a CORESET with index 0) (and for corresponding PDSCH reception).

Here, the above "CORESET" may be at least one of an arbitrary CORESETs, all CORESETs, all CORESETs except a CORESET related to a search space for a random access procedure (the search space ID is set by a higher layer parameter "ra-SearchSpace") (all CORESETs, except CORESET associated with ra-SearchSpace), a specific CORESET, a CORESET other than CORESET #0, or CORESET #0. Here, the "arbitrary CORESET" and the "all CORESETs" may include CORESET #0 or may be CORESETs other than CORESET #0. Note that CORESET #0 may be a CORESET configured by a higher layer parameter controlResourceSetZero, or may mean a CORESET with an index of 0.

Note that if the above "CORESET" does not include CORESET #0 (or is not CORESET #0), a condition that "until the UE receives by higher layers an activation for a TCI state or any of the parameters tci-StatesPDCCH-ToAddList and/or tci-StatesPDCCH-ToReleaseList" may be left as it is.

If the above "CORESET" includes CORESET #0 (or is CORESET #0), a condition that "until the UE receives by higher layers an activation for a TCI state or any of the parameters tci-StatesPDCCH-ToAddList and/or tci-StatesPDCCH-ToReleaseList" does not have to be included.

Meanwhile, regardless of whether the above "CORESET" includes CORESET #0, this condition may be left as it is or may be deleted.

Further, X described above may be determined in advance by the specifications (for example, X=28), may be set by the higher layer signaling or the like, or may be determined on the basis of the UE capability (for example, the UE capability related to the BFR). X of the first embodiment and X of the second embodiment may be different values or the same value. In addition, $q_{new}$ described above may be the same as $q_{new}$ of the first embodiment.

In a case where the BFR MAC CE is transmitted in the message 3 or the message A of the CBRA, the UE may update the QCL assumption of the PDCCH after completion of the CBRA. In this case, the base station can identify whether the message 3 or the message A is for CBRA BFR or for other CBRAs on the basis of whether or not the messages include the BFR MAC CE. Thereby, both the base station and the UE can control PDCCH transmission/reception after recognizing CBRA BFR completion.

Figure 5:
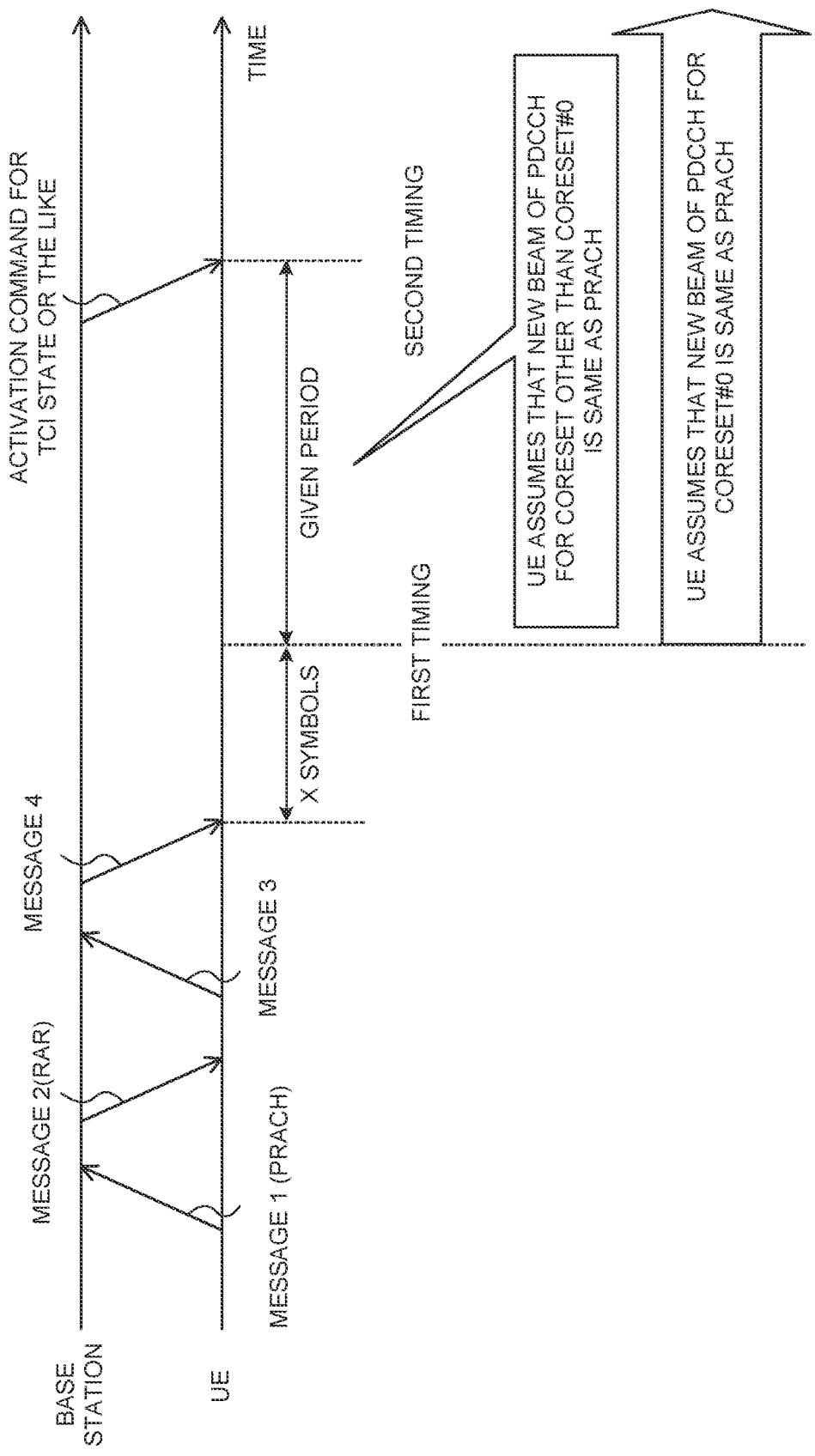
FIG. 5 is a diagram illustrating an example of update of a quasi-co-location (QCL) assumption for a PDCCH after CBRA BFR in a second embodiment.

FIG. 5 is a diagram illustrating an example of update of the QCL assumption for a PDCCH after the CBRA BFR in the second embodiment. In this example, the UE assumes that a new beam of a PDCCH for a CORESET other than CORESET #0 is the same as (a new beam of) a PRACH (the QCL assumption of $q_{new}$ described above is applied to the PDCCH) from a first timing to a second timing after completion of the CBRA BFR.

The first timing in FIG. 5 may be X symbols after the last symbol of PDCCH reception of the first message 4 where the CRC is scrambled by the C-RNTI and the UE detects a DCI format containing a UL grant for new transmission.

The second timing in FIG. 5 may be a timing at which an activation command for the TCI state for the PDCCH is received for a cell in which the CBRA BFR has been performed.

Furthermore, in this example, the UE assumes that a new beam of a PDCCH for CORESET #0 is the same as (a new beam of) a PRACH (the QCL assumption of $q_{new}$ described above is applied to the PDCCH) after the first timing after completion of the CBRA BFR. In this example, the UE receives the activation command for the TCI state for a CORESET other than CORESET #0 at the second timing, and the UE may continuously receive a PDCCH for CORESET #0 on the basis of the QCL assumption of $q_{new}$ described above even after the second timing.

According to the second embodiment described above, the UE can appropriately use a beam recovered by the CBRA BFR for subsequent transmission of the PDCCH.

OTHER EMBODIMENTS

Note that the contents of the above-described embodiments may be introduced into TS 38.213 § 6 Link recovery procedures in Rel. 16 NR similarly to the description related to BFR of a physical layer so far, or may be described in another chapter (for example, TS 38.213 § 8 Random access procedure). In the latter case, the contents may be specified in § 6 that the CBRA BFR is described in the another chapter.

Note that the above embodiment may be applied to the UE in which a specific parameter has been configured by RRC. The specific parameter may be, for example, a parameter that enables the BFR of Rel. 16 or a parameter (for example, "QCL_CBRA-BFR_r16") for setting the behavior of the QCL or the CBRA BFR for Rel. 16.

Note that the above embodiment may be applied to the UE that has reported specific capability information to the network. The capability information may be, for example, a capability regarding the QCL assumption of the CBRA BFR in a special cell (SpCell). The UE that has reported the capability information may apply the at least one QCL assumption/spatial relation assumption when performing the CBRA BFR in the SpCell.

Note that the first embodiment may be used for updating a spatial relation for a PUSCH after the BFR. In this case, for example, "PUCCH" and "PUCCH spatial relation information (for a PUCCH resource)" of the first embodiment may be replaced with "PUSCH" and "PUSCH spatial relation information (SRS spatial relation information)", respectively. In addition, the UE may assume that a spatial relation for a specific PUSCH is also updated when a spatial relation for a PUCCH of the first embodiment is updated.

Note that the second embodiment may be used to update QCL assumption for a PDSCH after the BFR. In this case, for example, "PDCCH" of the second embodiment may be replaced with "PDSCH". In addition, the UE may assume that QCL assumption of a specific PDSCH is also updated when QCL assumption of a PDCCH of the second embodiment is updated.

Note that the PCell/PSCell of the present disclosure may be replaced with the SpCell. Further, the SpCell may mean a cell other than the PCell/PSCell.

(Radio Communication System)

Hereinafter, a configuration of a radio communication system according to one embodiment of the present disclosure will be described. In this radio communication system, communication is performed using any one of the radio communication methods according to the embodiments of the present disclosure or a combination thereof.

Figure 6:
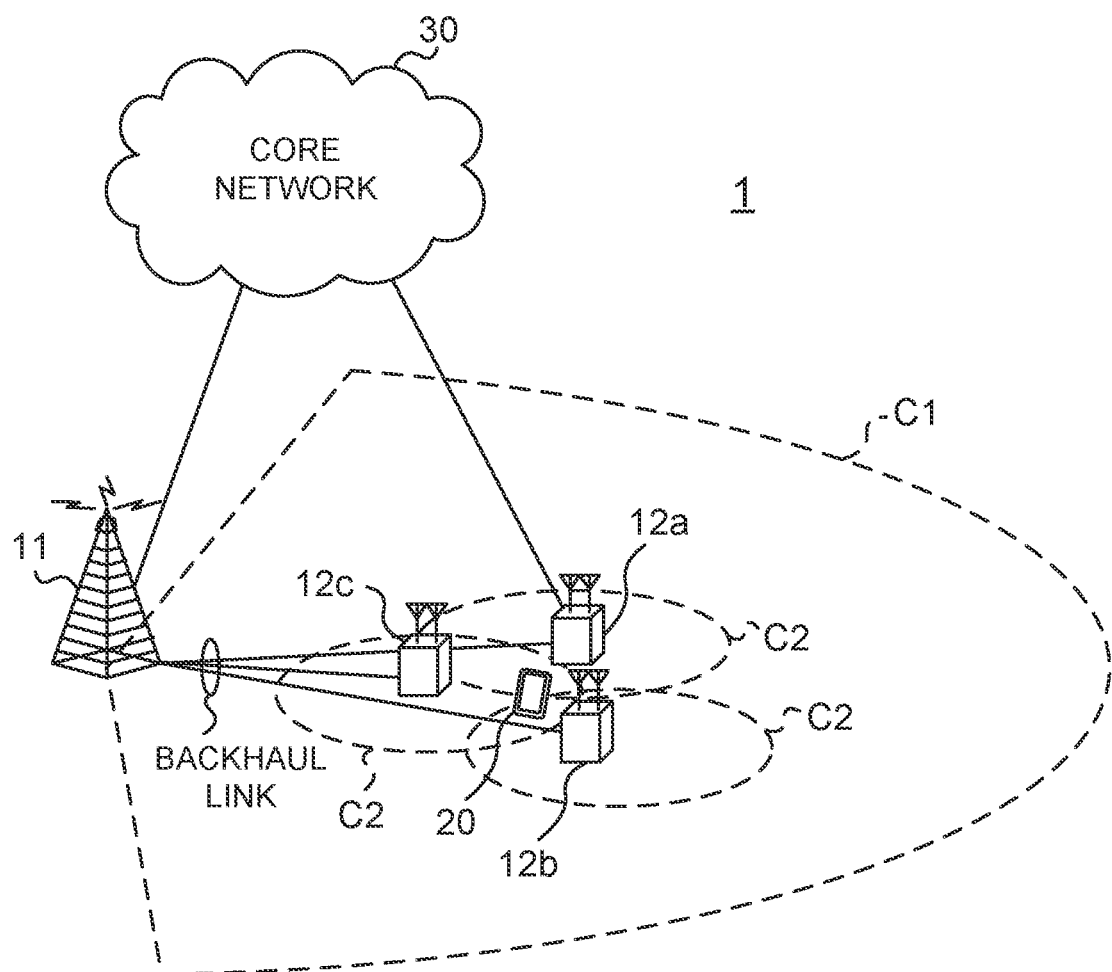
FIG. 6 is a diagram illustrating an example of a schematic configuration of a radio communication system according to one embodiment.

FIG. 6 is a diagram illustrating an example of a schematic configuration of a radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is the MN, and an LTE (E-UTRA) base station (eNB) is the SN.

The radio communication system 1 may support dual connectivity between a plurality of base stations in the same RAT (for example, dual connectivity in which both the MN and the SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as "base stations 10" when the base stations 11 and 12 are not distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a frequency range 1 (FR1) or a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency bands, definitions, and the like of the FR1 and FR2 are not limited thereto, and, for example, the FR1 may correspond to a frequency band higher than the FR2.

Further, the user terminal 20 may perform communication in each CC using at least one of time division duplex (TDD) or frequency division duplex (FDD).

The plurality of base stations 10 may be connected by wire (e.g., an optical fiber or an X2 interface in compliance with common public radio interface (CPRI)) or wirelessly (e.g., NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of an evolved packet core (EPC), a 5G core network (5GCN), or a next generation core (NGC).

The user terminal 20 may a terminal that corresponds to at least one of communication methods such as LTE, LTE-A, and 5G.

In the radio communication system 1, a radio access method based on orthogonal frequency division multiplexing (OFDM) may be used. For example, in at least one of downlink (DL) or uplink (UL), cyclic prefix OFDM (CP- OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH), a physical broadcast channel (PBCH), a physical downlink control channel (PDCCH), or the like shared by the user terminals 20 may be used.

Further, in the radio communication system 1, as an uplink channel, a physical uplink shared channel (PUSCH), a physical uplink control channel (PUCCH), a physical random access channel (PRACH), or the like shared by the user terminals 20 may be used.

User data, higher layer control information, a system information block (SIB), and the like are transmitted on the PDSCH. The PUSCH may transmit the user data, higher layer control information, and the like. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH or the PUSCH.

Note that the DCI that schedules the PDSCH may be referred to as DL assignment, DL DCI, or the like, and the DCI that schedules PUSCH may be referred to as UL grant, UL DCI, or the like. Note that the PDSCH may be replaced with DL data, and the PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor the CORESET associated with a given search space based on search space configuration.

One search space may correspond to a PDCCH candidate corresponding to one or more aggregation levels. One or more search spaces may be referred to as a search space set. Note that "search space" and "search space set", "search space configuration" and "search space set configuration", and "CORESET" and "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), or scheduling request (SR) may be transmitted on the PUCCH. A random access preamble for establishing connection with a cell may be transmitted on the PRACH.

Note that in the present disclosure, downlink, uplink, and the like may be expressed without "link". Various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) or a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that the DMRS may be referred to as a user terminal-specific reference signal (UE-specific reference signal).

(Base Station)

Figure 7:
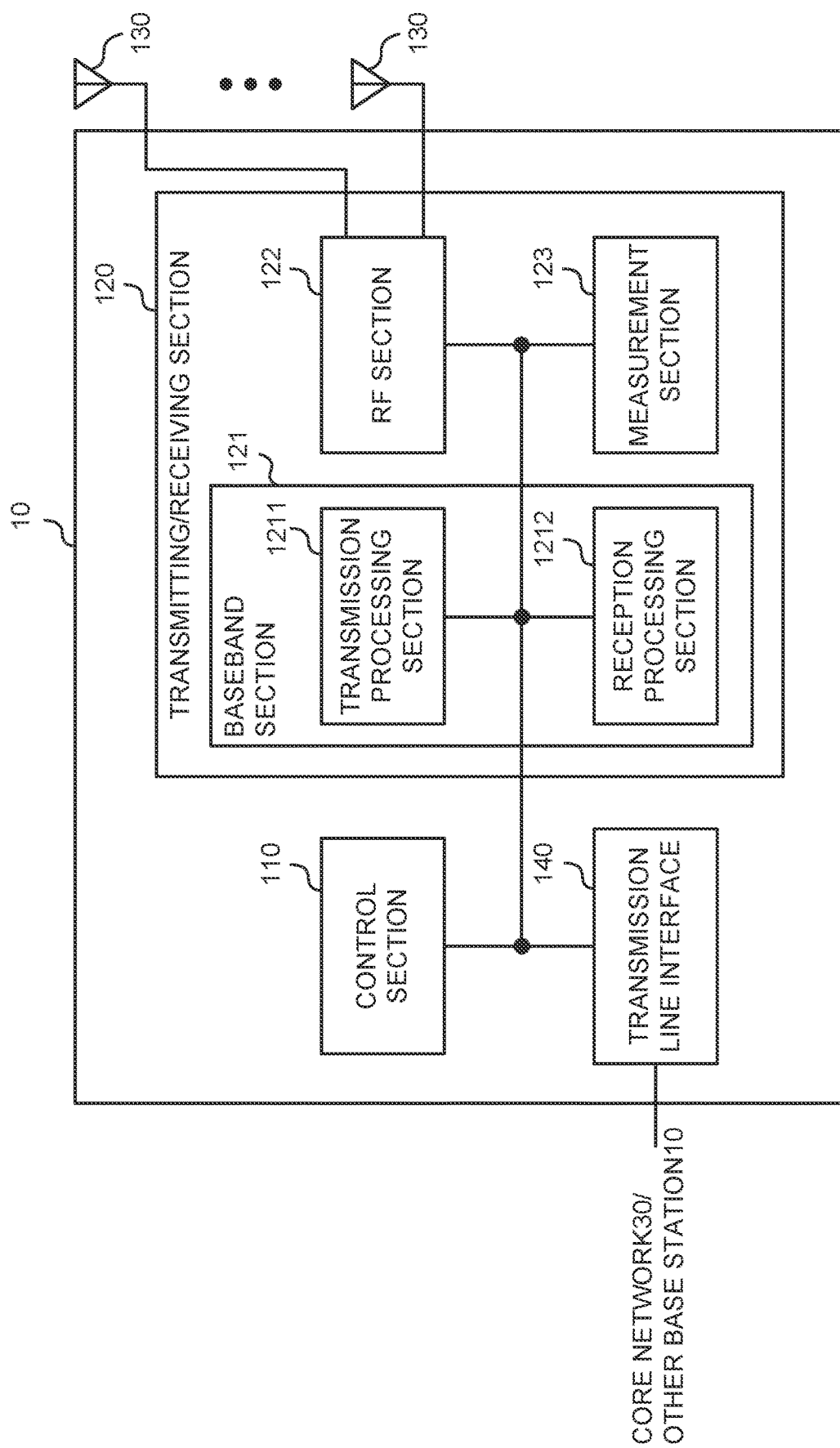
FIG. 7 is a diagram illustrating an example of a configuration of a base station according to one embodiment.

FIG. 7 is a diagram illustrating an example of a configuration of a base station according to one embodiment. The base station 10 includes a control section 110, a transmitting/receiving section 120, a transmitting/receiving antenna 130, and a transmission line interface 140. Note that one or more control sections 110, one or more transmitting/receiving sections 120, one or more transmission/reception antennas 130, and one or more transmission line interfaces 140 may be included.

Note that this example mainly describes a functional block which is a characteristic part of the present embodiment, and it may be assumed that the base station 10 also has another functional block necessary for radio communication. A part of processing of each section described below may be omitted.

The control section 110 controls the entire base station 10. The control section 110 can be implemented by a controller, a control circuit, and the like that are described based on common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may forward the data, the control information, the sequence, and the like to the transmitting/receiving section 120. The control section 110 may perform call processing (such as configuration or releasing) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitting section/receiving section, an RF circuit, a baseband circuit, a filter, a phase shifter, a measurement circuit, a transmission/reception circuit, and the like that are described on the basis of common recognition in the technical field related to the present disclosure.

The transmitting/receiving section 120 may be configured as an integrated transmitting/receiving section, or may be configured by a transmitting section and a receiving section. The transmitting section may include the transmission processing section 1211 and the RF section 122. The receiving section may be implemented by the reception processing section 1212, the RF section 122, and the measurement section 123.

The transmission/reception antennas 130 can be implemented by antennas described based on common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam or a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency band, filtering processing, amplification, and the like on the baseband signal, and may transmit a signal in the radio frequency band via the transmission/reception antenna 130.

Meanwhile, the transmitting/receiving section 120 (RF section 122) may perform amplification, filtering processing, demodulation to a baseband signal, and the like on the signal in the radio frequency band received by the transmission/reception antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM), channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, another base stations 10, and the like, and may acquire, transmit, and the like user data (user plane data), control plane data, and the like for the user terminal 20.

Note that the transmitting section and the receiving section of the base station 10 in the present disclosure may include at least one of the transmitting/receiving section 120, the transmission/reception antenna 130, and the transmission line interface 140.

Note that the transmitting/receiving section 120 may receive, in a given cell (for example, SpCell), a random access preamble (the message 1 or the message A) transmitted from the user terminal 20 in a case where a beam failure is detected.

The control section 110 may assume that the user terminal 20 applies the same spatial filter as the last random access preamble transmitted in the cell to an uplink control channel (PUCCH) after a given period from the last symbol of first downlink control channel reception where a downlink control information format having a cyclic redundancy check (CRC) scrambled by a cell radio network temporary identifier (C-RNTI) and containing an uplink grant for new transmission is detected and until the user terminal 20 receives specific information regarding spatial relation information for an uplink control channel, in a case where a beam failure recovery medium access control control element (MAC CE) is transmitted in the message 3 or the message A of the contention based random access procedure (for example, CBRA) corresponding to the random access preamble.

Here, the specific information regarding the spatial relation information for the uplink control channel may be, for example, at least one of an activation command for the PUCCH spatial relation information, or a higher layer parameter (PUCCH-SpatialRelationInfo) of the PUCCH spatial relation information for a PUCCH resource.

The control section 110 may assume that the user terminal 20 uses the same antenna port quasi-collocation parameters as ones associated with an index ($q_{new}$) of a reference signal corresponding to the random access preamble for monitoring of a downlink control channel (PDCCH) in a given control resource set (CORESET), after a given period (for example, X symbols) from the last symbol of first downlink control channel reception where a downlink control information format having a cyclic redundancy check (CRC) scrambled by a cell radio network temporary identifier (C-RNTI) and containing an uplink grant for new transmission is detected and until the terminal receives specific information regarding a transmission configuration indication (TCI) state of the downlink control channel, in a case where a beam failure recovery medium access control control element (MAC CE) is transmitted in a message 3 or a message A of a contention based random access procedure (for example, CBRA) corresponding to the random access preamble.

Here, the specific information regarding the TCI state of the downlink control channel may be, for example, at least one of an activation command for the TCI state or a higher layer parameter of a list of TCI states for the PDCCH (tci-StatesPDCCH-ToAddList for adding the TCI state to the list or tci-StatesPDCCH-ToReleaseList for removing the TCI state from the list).

(User Terminal)

Figure 8:
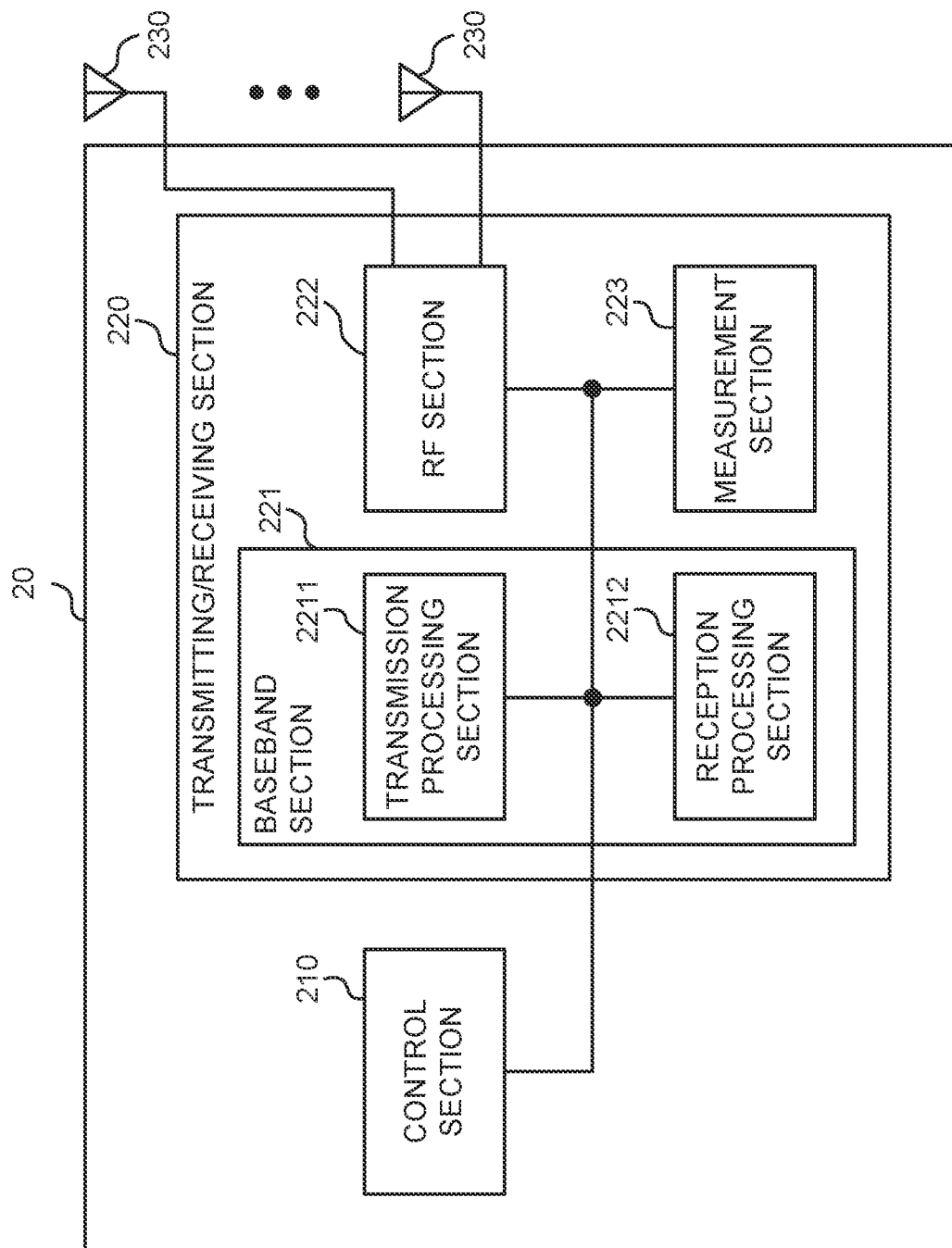
FIG. 8 is a diagram illustrating an example of a configuration of a user terminal according to one embodiment.

FIG. 8 is a diagram illustrating an example of a configuration of the user terminal according to one embodiment. The user terminal 20 includes a control section 210, a transmitting/receiving section 220, and a transmitting/receiving antenna 230. Note that one or more of the control sections 210, one or more of the transmitting/receiving sections 220, and one or more of the transmitting/receiving antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can be implemented by a controller, a control circuit, and the like that are described based on common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may forward the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be implemented by a transmitter/receiver, an RF circuit, a baseband circuit, a filter, a phase shifter, a measurement circuit, a transmitting/receiving circuit, and the like that are described based on common recognition in the technical field related to the present disclosure.

The transmitting/receiving section 220 may be configured as an integrated transmitting/receiving section, or may be implemented by a transmitting section and a receiving section. The transmitting section may include the transmission processing section 2211 and the RF section 222. The receiving section may be implemented by the reception processing section 2212, the RF section 222, and the measurement section 223.

The transmitting/receiving antenna 230 can be implemented by an antenna that is described based on common recognition in the technical field related to the present disclosure, for example, an array antenna or the like.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a Tx beam or a reception beam by using digital beam forming (e.g., precoding), analog beam forming (e.g., phase rotation), and the like.

The transmitting/receiving section 220 (transmission processing section 2211) may perform PDCP layer processing, RLC layer processing (e.g., RLC retransmission control), MAC layer processing (e.g., HARQ retransmission control), and the like, for example, on data, control information, and the like acquired from the control section 210, to generate a bit string to be transmitted.

The transmitting/receiving section 220 (transmission processing section 2211) may perform transmission processing such as channel coding (which may include error correction coding), modulation, mapping, filtering processing, DFT processing (if necessary), IFFT processing, precoding, or digital-analog conversion on the bit string to be transmitted, to output a baseband signal.

Note that whether or not to apply DFT processing may be determined based on configuration of transform precoding. In a case where transform precoding is enabled for a given channel (e.g., PUSCH), the transmitting/receiving section 220 (transmission processing section 2211) may perform DFT processing as the transmission processing in order to transmit the channel using a DFT-s-OFDM waveform. In a case where it is not the case, DFT processing need not be performed as the transmission processing.

The transmitting/receiving section 220 (RF section 222) may perform modulation to a radio frequency range, filtering processing, amplification, and the like on the baseband signal, to transmit a signal in the radio frequency range via the transmitting/receiving antenna 230.

Meanwhile, the transmitting/receiving section 220 (RF section 222) may perform amplification, filtering processing, demodulation to a baseband signal, and the like on the signal in the radio frequency range received by the transmitting/receiving antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220, the transmission/reception antenna 230, or the transmission line interface 240.

Note that in a case where a beam failure is detected, the transmitting/receiving section 220 may transmit the random access preamble (the message 1 or the message A) in a given cell (for example, SpCell).

The control section 210 may apply the same spatial filter as the last random access preamble transmitted in the cell to an uplink control channel (PUCCH) after a given period (for example, X symbols) from the last symbol of first downlink control channel reception where a downlink control information format having a cyclic redundancy check (CRC) scrambled by a cell radio network temporary identifier (C-RNTI) and containing an uplink grant for new transmission is detected and until specific information regarding spatial relation information for an uplink control channel is received, in a case where a beam failure recovery medium access control control element (MAC CE) is transmitted in the message 3 or the message A of the contention based random access procedure (for example, CBRA) corresponding to the random access preamble.

Here, the specific information regarding the spatial relation information for the uplink control channel may be, for example, at least one of an activation command for the PUCCH spatial relation information, or a higher layer parameter (PUCCH-SpatialRelationInfo) of the PUCCH spatial relation information for a PUCCH resource.

The control section 210 may assume the same antenna port quasi-collocation parameters as ones associated with an index ($q_{new}$) of a reference signal corresponding to the random access preamble (PRACH) for monitoring of a downlink control channel (PDCCH) in a given control resource set (CORESET), after a given period (for example, X symbols) from the last symbol of first downlink control channel reception where a downlink control information format having a cyclic redundancy check (CRC) scrambled by a cell radio network temporary identifier (C-RNTI) and containing an uplink grant for new transmission is detected and until the terminal receives specific information regarding a transmission configuration indication (TCI) state of the downlink control channel, in a case where a beam failure recovery medium access control control element (MAC CE) is transmitted in a message 3 or a message A of a contention based random access procedure (for example, CBRA) corresponding to the random access preamble.

Here, the specific information regarding the TCI state of the downlink control channel may be, for example, at least one of an activation command for the TCI state or a higher layer parameter of a list of TCI states for the PDCCH (tci-StatesPDCCH-ToAddList for adding the TCI state to the list or tci-StatesPDCCH-ToReleaseList for removing the TCI state from the list).

The given control resource set may be all control resource sets except a control resource set related to a search space for the random access procedure.

The given control resource set may include control resource set #0.

The given control resource set does not have to include control resource set #0.

(Hardware Configuration)

Note that the block diagrams that have been used to describe the above embodiments illustrate blocks in functional units. These functional blocks (components) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional block may be implemented by combining the one or the plural apparatuses with software.

Here, functions include, but are not limited to, determining, determining, judging, computing, calculating, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning. For example, a functional block (component) that has a transmission function may be referred to as a transmission section (transmitting unit), a transmitter, and the like. In any case, as described above, the implementation method is not particularly limited.

Figure 9:
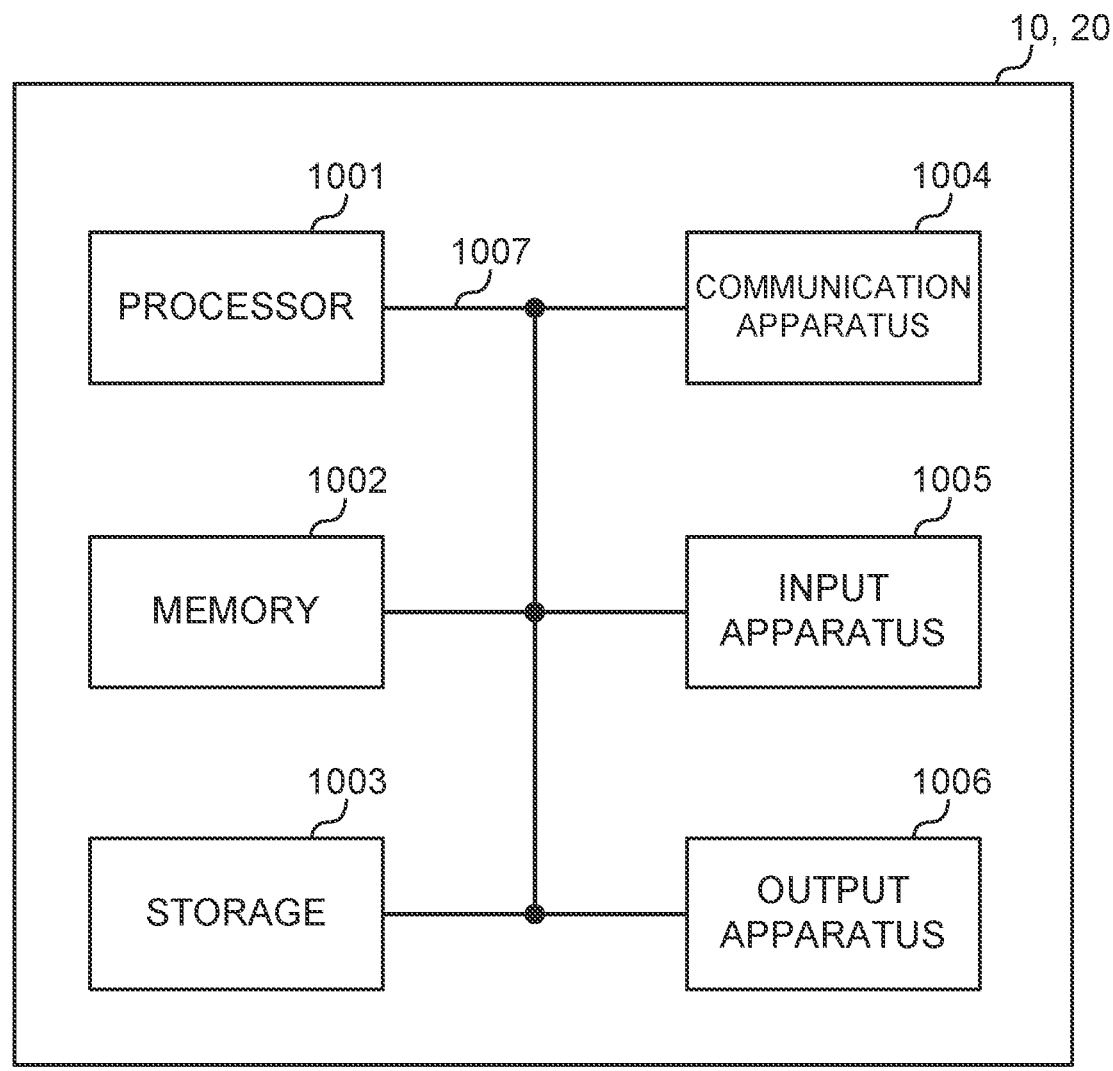
FIG. 9 is a diagram illustrating an example of a hardware configuration of the base station and the user terminal according to one embodiment.

For example, the base station, the user terminal, and so on according to one embodiment of the present disclosure may function as a computer that executes the processing of the radio communication method of the present disclosure. FIG. 9 is a diagram illustrating an example of a hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that, in the present disclosure, the terms such as an apparatus, a circuit, a device, a section, or a unit can be replaced with each other. The hardware configuration of the base station 10 and the user terminal 20 may be configured including one or a plurality of the apparatuses illustrated in the drawings, or may be configured without including some apparatuses.

For example, although only one processor 1001 is illustrated, there may be a plurality of processors. Further, the processing may be executed by one processor, or the processing may be executed by two or more processors simultaneously or sequentially, or using other methods. Note that, the processor 1001 may be implemented with one or more chips.

For example, each function of the base station 10 and the user terminal 20 is implemented by causing given software (program) to be read onto hardware such as the processor 1001 and the memory 1002, and by the processor 1001 performing arithmetic operation to control communication via the communication apparatus 1004 and control at least one of reading or writing of data in the memory 1002 and the storage 1003.

The processor 1001 controls the whole computer by, for example, running an operating system. The processor 1001 may be implemented by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads a program (program code), a software module, data, and the like from at least one of the storage 1003 or the communication apparatus 1004 into the memory 1002, and executes various types of processing in accordance with these. As the program, a program that causes a computer to execute at least a part of the operation described in the above-described embodiment is used. For example, the control section 110 (210) may be implemented by a control program that is stored in the memory 1002 and operates in the processor 1001, and another functional block may be implemented similarly.

The memory 1002 is a computer-readable recording medium, and may include, for example, at least one of a read only memory (ROM), an erasable programmable ROM (EPROM), an electrically EPROM (EEPROM), a random access memory (RAM), or other appropriate storage media. The memory 1002 may be referred to as a register, a cache, a main memory (primary storage apparatus), and the like. The memory 1002 may store a program (program code), a software module, and the like executable for implementing the radio communication method according to an embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disk, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as "secondary storage apparatus."

The communication apparatus 1004 is hardware (transmitting/receiving device) for performing inter-computer communication via at least one of a wired network or a wireless network, and is referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) or time division duplex (TDD). For example, the transmitting/receiving section 120 (220), the transmission/reception antenna 130 (230), and the like described above may be implemented by the communication apparatus 1004. The transmitting/receiving section 120 (220) may be implemented by being physically or logically separated into the transmitting section 120a (220a) and the receiving section 120b (220b).

The input apparatus 1005 is an input device for receiving input from the outside (for example, a keyboard, a mouse, a microphone, a switch, a button, a sensor and so on). The output apparatus 1006 is an output device that performs output to the outside (for example, a display, a speaker, a light emitting diode (LED) lamp, or the like). Note that the input apparatus 1005 and the output apparatus 1006 may be provided in an integrated structure (for example, a touch panel).

Furthermore, apparatuses such as the processor 1001 and the memory 1002 are connected to each other by the bus 1007 for communicating information. The bus 1007 may be formed by using a single bus, or may be formed by using different buses for respective connections between apparatuses.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by using the hardware. For example, the processor 1001 may be implemented with at least one of these pieces of hardware.
(Variations)

Note that terms described in the present disclosure and terms necessary for understanding the present disclosure may be replaced with terms that have the same or similar meanings. For example, a channel, a symbol, and a signal (signal or signaling) may be replaced with each other. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may include one or more periods (frames) in a time domain. Each of the one or more periods (frames) included in the radio frame may be referred to as a subframe. Further, the subframe may include one or more slots in the time domain. The subframe may have a fixed time length (for example, 1 ms) that does not depend on numerology.

Here, the numerology may be a communication parameter used for at least one of transmission or reception of a given signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, specific windowing processing performed by a transceiver in the time domain, or the like.

The slot may include one or more symbols in the time domain (orthogonal frequency division multiplexing (OFDM) symbols, single carrier frequency division multiple access (SC-FDMA) symbols, and the like). Also, a slot may be a time unit based on numerology.

The slot may include a plurality of mini slots. Each mini slot may include one or more symbols in the time domain. Further, the mini slot may be referred to as a subslot. Each mini slot may include fewer symbols than the slot. A PDSCH (or PUSCH) transmitted in a time unit larger than the mini slot may be referred to as "PDSCH (PUSCH) mapping type A". A PDSCH (or PUSCH) transmitted using the mini slot may be referred to as a PDSCH (PUSCH) mapping type B.

The radio frame, subframe, slot, mini slot, and symbol all represent a time unit when transmitting a signal. The radio frame, the subframe, the slot, the mini slot, and the symbol may be called by other applicable names, respectively. Note that, the time units such as the frame, subframe, slot, mini slot, and symbol in the present disclosure may be replaced with each other.

For example, one subframe may be referred to as a TTI, a plurality of consecutive subframes may be referred to as a TTI, or one slot or one mini slot may be referred to as a TTI. That is, at least one of the subframe or the TTI may be a subframe (1 ms) in the existing LTE, may be a period shorter than 1 ms (for example, one to thirteen symbols), or may be a period longer than 1 ms. Note that, the unit indicating the TTI may be referred to as the slot, mini slot, and the like instead of the subframe.

Here, the TTI refers to, for example, the minimum time unit of scheduling in the radio communication. For example, in the LTE system, a base station performs scheduling to allocate radio resources (a frequency bandwidth, transmission power, and the like that can be used in each user terminal) to each user terminal in TTI units. Note that, definition of the TTI is not limited to this.

The TTI may be a transmission time unit of channel coded data packet (transport block), code block, codeword, and the like, or may be a processing unit of scheduling, link adaptation, and the like. Note that, when the TTI is given, a time interval (for example, the number of symbols) to which the transport block, code block, codeword, and the like are actually mapped may be shorter than the TTI.

Note that, when one slot or one mini slot is referred to as the TTI, one or more TTIs (that is, one or more slots or one or more mini slots) may be the minimum time unit of scheduling. Furthermore, the number of slots (the number of mini slots) forming the minimum time unit of the scheduling may be controlled.

A TTI having a time length of 1 ms may be referred to as a usual TTI (TTI in 3GPP Rel. 8 to 12), a normal TTI, a long TTI, a usual subframe, a normal subframe, a long subframe, a slot, and the like. A TTI that is shorter than the usual TTI may be referred to as a shortened TTI, a short TTI, a partial TTI (or fractional TTI), a shortened subframe, a short subframe, a mini slot, a subslot, a slot, and the like.

Note that, the long TTI (for example, the usual TTI, subframe, and the like) may be replaced with a TTI having a time length longer than 1 ms, and the short TTI (for example, the shortened TTI and the like) may be replaced with a TTI having a TTI length shorter than the TTI length of the long TTI and not shorter than 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in the RB may be determined on the basis of the numerology.

Furthermore, the RB may include one or more symbols in the time domain, and have the length of one slot, one mini slot, one subframe, or one TTI. One TTI, one subframe, and the like may include one or more resource blocks.

Note that one or more RBs may be referred to as a physical resource block (PRB), a subcarrier group (SCG), a resource element group (REG), a PRB pair, an RB pair, and the like.

Furthermore, a resource block may include one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a given numerology in a given carrier. Here, the common RB may be specified by the index of the RB based on a common reference point of the carrier. The PRB may be defined in a given BWP and numbered within the BWP.

The BWP may include a BWP for UL (UL BWP) and a BWP for DL (DL BWP). For the UE, one or more BWPs may be configured within one carrier.

At least one of the configured BWPs may be active, and it is not necessary to assume that the UE transmits and receives a given signal/channel outside the active BWP. Note that, a "cell", a "carrier", and the like in the present disclosure may be replaced with a BWP.

Note that the structures of radio frames, subframes, slots, mini slots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

Furthermore, the information, parameters, and the like described in the present disclosure may be represented using absolute values, represented using relative values with respect to given values, or represented using other corresponding information. For example, the radio resource may be indicated by a given index.

The names used for the parameters and the like in the present disclosure are not limited names in any respect. Further, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represented using any of various different technologies. For example, the data, instruction, command, information, signal, bit, symbol, chip, and the like that may be referred to throughout the above description may be represented by the voltage, current, electromagnetic wave, magnetic field or magnetic particle, optical field or photon, or any combination thereof.

Furthermore, the information, signals, and the like may be output in at least one of a direction from a higher layer to a lower layer or a direction from the lower layer to the higher layer. The information, signals, and the like may be input and output via a plurality of network nodes.

The information, signals, and the like that are input and output may be stored in a specific location (for example, in a memory), or may be managed using a management table. The information, signals, and the like to be input and output can be overwritten, updated, or appended. The output information, signals, and the like may be deleted. The information, signals, and the like that are input may be transmitted to other apparatuses.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of the MAC signaling may be performed using, for example, an MAC control element (CE).

Furthermore, notification of given information (for example, notification of "being X") does not necessarily have to be explicit, and may be given implicitly (for example, by not giving notification of the given information or by notification of other information).

Judging may be performed by a one-bit value (0 or 1), by a Boolean indicated by true or false, or by comparison of numerical values (for example, comparison with a given value).

Regardless of whether software is referred to as software, firmware, middleware, microcode, or hardware description language, or referred to by other names, this should be interpreted broadly, to mean an instruction, an instruction set, a code, a code segment, a program code, a program, a subprogram, a software module, an application, a software application, a software package, a routine, a subroutine, an object, an executable file, an execution thread, a procedure, a function, and the like.

Also, software, instructions, information and so on may be transmitted and received via communication media. For example, when software is transmitted from a website, a server, or another remote source by using at least one of a wired technology (coaxial cable, optical fiber cable, twisted pair, digital subscriber line (DSL), or the like) or a wireless technology (infrared rays, microwaves, and the like), at least one of the wired technology or the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of at least one of the base station or the base station subsystem that performs a communication service in this coverage.

In the present disclosure, the terms such as "mobile station (MS)", "user terminal", "user equipment (UE)", and "terminal" can be used interchangeably.

A mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station or the mobile station may be referred to as a transmission apparatus, a reception apparatus, a radio communication apparatus, and the like. Note that at least one of the base station or the mobile station may be a device mounted on a moving object, a moving object itself, and the like. The moving object may be a transportation (for example, a car, an airplane, or the like), an unmanned moving object (for example, a drone, an autonomous car, or the like), or a (manned or unmanned) robot. Note that at least one of the base station or the mobile station also includes an apparatus that does not necessarily move during a communication operation. For example, at least one of the base station or the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be replaced with terms corresponding to communication between terminals (for example, "side"). For example, an uplink channel, a downlink channel, and the like may be replaced with a side channel.

Similarly, the user terminal in the present disclosure may be replaced with a base station. In this case, the base station 10 may have the function of the user terminal 20 described above.

In the present disclosure, an operation performed by a base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

Each aspect/embodiment described in the present disclosure may be used alone, used in a combination, and switched in association with execution. Further, the order of processing procedures, sequences, flowcharts, and the like of the aspects/embodiments described in the present disclosure may be re-ordered as long as there is no inconsistency. For example, regarding the method described in the present disclosure, elements of various steps are presented using an exemplary order, and the order is not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (x is, for example, an integer or decimal), future radio access (FRA), new radio access technology (RAT), new radio (NR), new radio access (NX), future generation radio access (FX), global system for mobile communications (GSM (registered trademark)), CDMA 2000, ultra mobile broadband (3 MB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded on the basis of these, and the like. Further, a plurality of systems may be combined and applied (for example, a combination of LTE or LTE-A and 5G, and the like).

The term "on the basis of" used in the present disclosure does not mean "only on the basis of" unless otherwise specified. In other words, the term "on the basis of" means both "only on the basis of" and "at least on the basis of".

All references to the elements using designations such as "first" and "second" as used in the present disclosure do not generally limit the amount or sequence of these elements. These designations can be used in the present disclosure, as a convenient way of distinguishing between two or more elements. Thus, references to first and second elements do not mean that only the two elements can be employed, or that the first element must precede the second element in some form.

The term "determining" as used in the present disclosure may include a wide variety of operations. For example, "determining" may be regarded as "determining" judging, calculating, computing, processing, deriving, investigating, looking up (or searching or inquiring) (for example, looking up in a table, database, or another data structure), ascertaining, and the like.

Furthermore, "determining" may be regarded as "determining" receiving (e.g., receiving information), transmitting (e.g., transmitting information), inputting, outputting, accessing (e.g., accessing data in memory), and the like.

Moreover, "determining" may be interpreted as "determining" resolving, selecting, choosing, establishing, comparing, and the like. In other words, "determining" as used herein may be interpreted to mean making "determinations" related to some operations.

In addition, "determining" may be replaced with "assuming", "expecting", "considering", or the like.

The "maximum transmission power" described in the present disclosure may mean a maximum value of transmission power, nominal UE maximum transmit power, or rated UE maximum transmit power.

The terms "connected" and "coupled" used in the present disclosure, or all variations of these terms mean all direct or indirect connections or couplings between two or more elements, and can include the presence of one or more intermediate elements between two elements that are "connected" or "coupled" to each other. The coupling or connection between the elements may be physical, logical, or a combination of these. For example, "connection" may be replaced with "access".

In the present disclosure, when two elements are connected, these elements can be considered to be "connected" or "coupled" to each other by using one or more electrical wires, cables, printed electrical connections, and the like, and, in some non-limiting and non-inclusive examples, by using, for example, electromagnetic energy having wavelengths in the radio frequency domain, microwave regions, and (both visible and invisible) optical regions.

In the present disclosure, the phrase "A and B are different" may mean "A and B are different from each other". Note that the phrase may mean that "A and B are different from C". The terms such as "detached" and "coupled" may be interpreted similarly to "different".

When the terms such as "include" and "including" and variations thereof are used in the present disclosure, these terms are intended to be inclusive similarly to the term "comprising". The term "or" used in the present disclosure is intended not to be an exclusive-OR.

In the present disclosure, for example, when an article such as "a", "an", and "the" in English is added in translation, the present disclosure may include the fact that a noun following these articles may be nouns of plural forms.

Although the invention according to the present disclosure has been described in detail above, it is obvious to a person skilled in the art that the invention according to the present disclosure is not limited to the embodiments described in the present disclosure. The invention according to the present disclosure can be embodied with various corrections and in various modified aspects, without departing from the spirit and scope of the invention defined on the basis of the description of claims. Consequently, the description of the present disclosure is provided only for the purpose of explaining examples, and should by no means be construed to limit the invention according to the present disclosure in any way.

What is claimed is:

1. A terminal comprising:
    a transmitter that, when beam failure is detected, transmits a random access preamble on a cell; and
    a processor that, when a Medium Access Control Control Element (MAC CE) for beam failure recovery is transmitted in a message, to a base station, of a contention-based random access procedure corresponding to the random access preamble, uses, for uplink control channel transmission on the cell on which the random access preamble is transmitted, a same spatial filter as for a last random access preamble transmission, after a certain duration from a last symbol of downlink control channel reception of a message, from the base station, where a downlink control information format with Cyclic Redundancy Check (CRC) scrambled by a Cell Radio Network Temporary Identifier (C-RNTI) is detected, and until receiving an activation command for spatial relation information of the uplink control channel if information regarding the spatial relation information of the uplink control channel is provided,
    wherein the message to the base station is message A,
    wherein the message from the base station is message B, and
    wherein the processor determines a transmission power of the uplink control channel according to a formula for determination of the transmission power by using qu=0, qd=qnew, and l=0, where the qu is an index of P0 for an uplink control channel indicating P0 for the uplink control channel in a P0 set for the uplink control channel, the qd is an index of pathloss reference reference signal (RS), the qnew is an index of a Synchronization Signal (SS)/Physical Broadcast Channel (PBCH) block selected for a last random access channel transmission, and the l is an index of an uplink control channel power control adjustment state.

2. A radio communication method for a terminal, comprising:
    when beam failure is detected, transmitting a random access preamble on a cell; and
    when a Medium Access Control Control Element (MAC CE) for beam failure recovery is transmitted in a message, to a base station, of a contention-based random access procedure corresponding to the random access preamble, using, for uplink control channel transmission on the cell on which the random access preamble is transmitted, a same spatial filter as for a last random access preamble transmission, after a certain duration from a last symbol of downlink control channel reception of a message, from the base station, where a downlink control information format with Cyclic Redundancy Check (CRC) scrambled by a Cell Radio Network Temporary Identifier (C-RNTI) is detected, and until receiving an activation command for spatial relation information of the uplink control channel if information regarding the spatial relation information of the uplink control channel is provided,
    wherein the message to the base station is message A,
    wherein the message from the base station is message B, and
    wherein a transmission power of the uplink control channel is determined according to a formula for determination of the transmission power by using qu=0, qd=qnew, and l=0, where the qu is an index of P0 for an uplink control channel indicating P0 for the uplink control channel in a P0 set for the uplink control channel, the qd is an index of pathloss reference reference signal (RS), the qnew is an index of a Synchronization Signal (SS)/Physical Broadcast Channel (PBCH) block selected for a last random access channel transmission, and the l is an index of an uplink control channel power control adjustment state.

3. A base station comprising:
a receiver that receives, on a cell, a random access preamble that is transmitted from a terminal when beam failure is detected; and
a processor that, when a Medium Access Control Control Element (MAC CE) for beam failure recovery is transmitted in a message, from the terminal, of a contention-based random access procedure corresponding to the random access preamble, assumes that the terminal uses, for uplink control channel transmission on the cell on which the random access preamble is transmitted, a same spatial filter as for a last random access preamble transmission, after a certain duration from a last symbol of downlink control channel reception of a message, to the terminal, where a downlink control information format with Cyclic Redundancy Check (CRC) scrambled by a Cell Radio Network Temporary Identifier (C-RNTI) is detected, and until the terminal receives an activation command for spatial relation information of the uplink control channel if information regarding the spatial relation information of the uplink control channel is provided,
wherein the message from the terminal is message A,
wherein the message to the terminal is message B, and
wherein a transmission power of the uplink control channel is determined according to a formula for determination of the transmission power by using qu=0, qd=qnew, and l=0, where the qu is an index of P0 for an uplink control channel indicating P0 for the uplink control channel in a P0 set for the uplink control channel, the qd is an index of pathloss reference reference signal (RS), the qnew is an index of a Synchronization Signal (SS)/Physical Broadcast Channel (PBCH) block selected for a last random access channel transmission, and the l is an index of an uplink control channel power control adjustment state.

4. A system comprising a terminal and a base station, wherein
the terminal comprises:
a transmitter that, when beam failure is detected, transmits a random access preamble on a cell; and
a processor that, when a Medium Access Control Control Element (MAC CE) for beam failure recovery is transmitted in a message, to the base station, of a contention-based random access procedure corresponding to the random access preamble, uses, for uplink control channel transmission on the cell on which the random access preamble is transmitted, a same spatial filter as for a last random access preamble transmission, after a certain duration from a last symbol of downlink control channel reception of a message, from the base station, where a downlink control information format with Cyclic Redundancy Check (CRC) scrambled by a Cell Radio Network Temporary Identifier (C-RNTI) is detected, and until receiving an activation command for spatial relation information of the uplink control channel if information regarding the spatial relation information of the uplink control channel is provided,
wherein the message to the base station is message A,
wherein the message from the base station is message B, and
wherein the processor determines a transmission power of the uplink control channel according to a formula for determination of the transmission power by using qu=0, qd=qnew, and l=0, where the qu is an index of P0 for an uplink control channel indicating P0 for the uplink control channel in a P0 set for the uplink control channel, the qd is an index of pathloss reference reference signal (RS), the qnew is an index of a Synchronization Signal (SS)/Physical Broadcast Channel (PBCH) block selected for a last random access channel transmission, and the l is an index of an uplink control channel power control adjustment state, and
the base station comprises:
a receiver that receives, on the cell, the random access preamble; and
a processor that, when the MAC CE for beam failure recovery is transmitted in the message A of the contention-based random access procedure, assumes that the terminal uses, for the uplink control channel transmission on the cell on which the random access preamble is transmitted, the same spatial filter as for the last random access preamble transmission, after the certain duration from the last symbol of downlink control channel reception of the message B where the downlink control information format with the CRC scrambled by the C-RNTI is detected, and until the terminal receives the activation command for spatial relation information of the uplink control channel if information regarding the spatial relation information of the uplink control channel is provided.

* * * * *